US009822913B2

United States Patent
Considine, Jr. et al.

(10) Patent No.: US 9,822,913 B2
(45) Date of Patent: Nov. 21, 2017

(54) QUICK CONNECTOR FOR HYDRAULIC HOSE COUPLING

(71) Applicant: Caterpillar Inc., Peoria, IL (US)

(72) Inventors: Patrick E. Considine, Jr., Aurora, IL (US); Carl H. Rempert, Shorewood, IL (US)

(73) Assignee: Caterpillar Inc., Peoria, IL (US)

( * ) Notice: Subject to any disclaimer, the term of this patent is extended or adjusted under 35 U.S.C. 154(b) by 148 days.

(21) Appl. No.: 14/659,073

(22) Filed: Mar. 16, 2015

(65) Prior Publication Data

US 2016/0273686 A1    Sep. 22, 2016

(51) Int. Cl.
F16L 37/10    (2006.01)
E02F 9/22    (2006.01)

(52) U.S. Cl.
CPC .......... *F16L 37/105* (2013.01); *E02F 9/2275* (2013.01); *F16L 2201/20* (2013.01)

(58) Field of Classification Search
CPC .. F16L 19/005; F16L 19/0212; F16L 19/0218
USPC .......................................... 285/92, 354, 391
See application file for complete search history.

(56) References Cited

U.S. PATENT DOCUMENTS

| | | | | | |
|---|---|---|---|---|---|
| 222,713 | A | * | 12/1879 | Lawson | F16L 9/08 285/391 |
| 1,077,710 | A | * | 11/1913 | Hesse | F16L 37/2445 285/354 |
| 1,325,468 | A | * | 12/1919 | Foster | F16L 37/252 285/391 |
| 2,111,859 | A | * | 3/1938 | Kennedy | F16L 37/252 285/110 |
| 3,540,762 | A | * | 11/1970 | Dunlap | F16L 37/105 285/391 |
| 3,596,932 | A | * | 8/1971 | Kinsey | F16L 19/0212 285/111 |
| 4,260,180 | A | * | 4/1981 | Halushka | F16L 37/004 285/391 |
| 4,406,485 | A | * | 9/1983 | Giebeler | F16L 37/00 285/391 |
| 5,403,043 | A | * | 4/1995 | Smet | F16L 37/2445 285/391 |
| 5,580,079 | A | * | 12/1996 | Pradel | F15B 15/12 267/277 |
| 5,823,702 | A | * | 10/1998 | Bynum | F16L 19/005 285/82 |
| 6,824,170 | B2 | | 11/2004 | Lee | |
| 2004/0207202 | A1 | * | 10/2004 | Parks | F16L 37/105 285/391 |
| 2013/0146305 | A1 | * | 6/2013 | Dupal | E21B 19/16 285/386 |

(Continued)

FOREIGN PATENT DOCUMENTS

DE    3743170 C1 *    5/1989    ........... F16L 19/005
EP    2045502 81    1/2012
KR    1037586 B1    5/2011

*Primary Examiner* — David E Bochna

(74) *Attorney, Agent, or Firm* — Miller, Matthias & Hull LLP

(57) ABSTRACT

A hydraulic fluid line coupling system is disclosed. The coupling may include a female fitting, a male fitting, first and second elastomeric seals between the female fitting and male fitting, and a lock nut securing the female fitting to the male fitting, and the lock nut including a plurality of threads.

19 Claims, 6 Drawing Sheets

(56) References Cited

U.S. PATENT DOCUMENTS

2013/0161941 A1\* 6/2013 Zulauf .................... F16L 19/02
                                                              285/80
2014/0152004 A1   6/2014 Ko \* cited by examiner

US 9,822,913 B2

QUICK CONNECTOR FOR HYDRAULIC HOSE COUPLING

TECHNICAL FIELD

The present disclosure generally relates to hydraulic systems and, more particularly, relates to couplings for hydraulic hoses and tubes of hydraulics systems.

BACKGROUND

Hydraulics are used in numerous applications. For example, with earth moving, construction, and agricultural equipment, various implements and attachments are powered by hydraulic cylinders. Using a track-type tractor as an example, the blade, bucket or other implement on the front of the loader are attached to boom arms swingably attached to the chassis of the track-type tractor. Movement of the boom arms and implements are powered by hydraulic cylinders. The hydraulic cylinders are in turn in fluid communication with a hydraulic fluid pump powered by an engine mounted on the chassis. Accordingly, it can be seen that multiple couplings are needed when communicating the hydraulic fluid from the pump to the cylinders.

While effective, and used for decades, the couplings between the various tubes and hoses of the hydraulic system are particularly prone to leakage. Such leakage necessarily detrimentally affects the efficiency of the machine, adds cost to operation of the machine, and disturbs the environment.

In light of the foregoing, it has been known to provide robust couplings between the hydraulic conduits of such hydraulic systems. Such robust couplings typically include a plurality of threaded bolts connecting fittings attached to the adjacent hydraulic hoses. The inclusion of multiple bolts, typically four, thus makes it a fairly time consuming process to connect and disconnect conduits. In addition, current couplings are rotationally sensitive in that the mating halves of the coupling must be symmetrically aligned before the bolts can be attached. This also adds to the time involved with changing conduits. Moreover, leakage from such robust connectors continues to be problematic.

With respect to patented technology, U.S. Pat. No. 7,490,388 discloses a clamp for connecting a duct to a base surface which includes a hinged clamp assembly sized so as to circumscribe the ducts being joining. A threaded bolt removably connects the two halves of the clamp together. However, such a device does not provide any sealing capability whatsoever.

Accordingly, it can be seen that a need exists for a hydraulic fluid line coupling system with improved resistance to leakage, reduced reliance on rotational orientation of the coupling components, quick assembly and disassembly, and which is designed for reduced likelihood of accidental pressure discharge.

SUMMARY

In accordance with one aspect of the disclosure, hydraulic fluid line coupling system is disclosed which may comprise a female fitting, a male fitting, and a lock nut securing the female fitting to the male fitting, the lock nut having a plurality of threads.

In accordance for another aspect of the disclosure, a method of sealing a hydraulic fluid line coupling system is disclosed which may comprise inserting a male fitting into a female fitting, sealing the male fitting to the female fitting a lock nut having a plurality of threads.

In accordance with yet another aspect of the disclosure, a machine is disclosed which may comprise a chassis, engine mounted on the chassis, a hydraulic fluid pump powered by the engine, hydraulic cylinder in fluid the communication with the hydraulic fluid pump, a plurality of a hydraulic fluid tubes connecting the hydraulic fluid pump and the hydraulic cylinder, a hydraulic fluid line coupling system connecting the plurality of the hydraulic fluid tubes together, the hydraulic fluid line coupling system including a male fitting, a female fitting, first and second elastomeric seals between the male and female fittings, and a lock nut securing the female fitting to the male fitting, the lock nut having a plurality of threads.

These are other aspects and features of the present disclosure will be more readily understood when read in light of the following detailed description when taken in conjunction with the accompany drawings.

While the present disclosure is susceptible to various modifications and alternative constructions, certain illustrative embodiments that shown and described below in detail. However, it is to be understood that the present disclosure is not limited to the specific embodiments disclosed, but instead includes all modifications, alternatives, constructions, and equivalents thereof.

DETAILED DESCRIPTION

Figure 1:
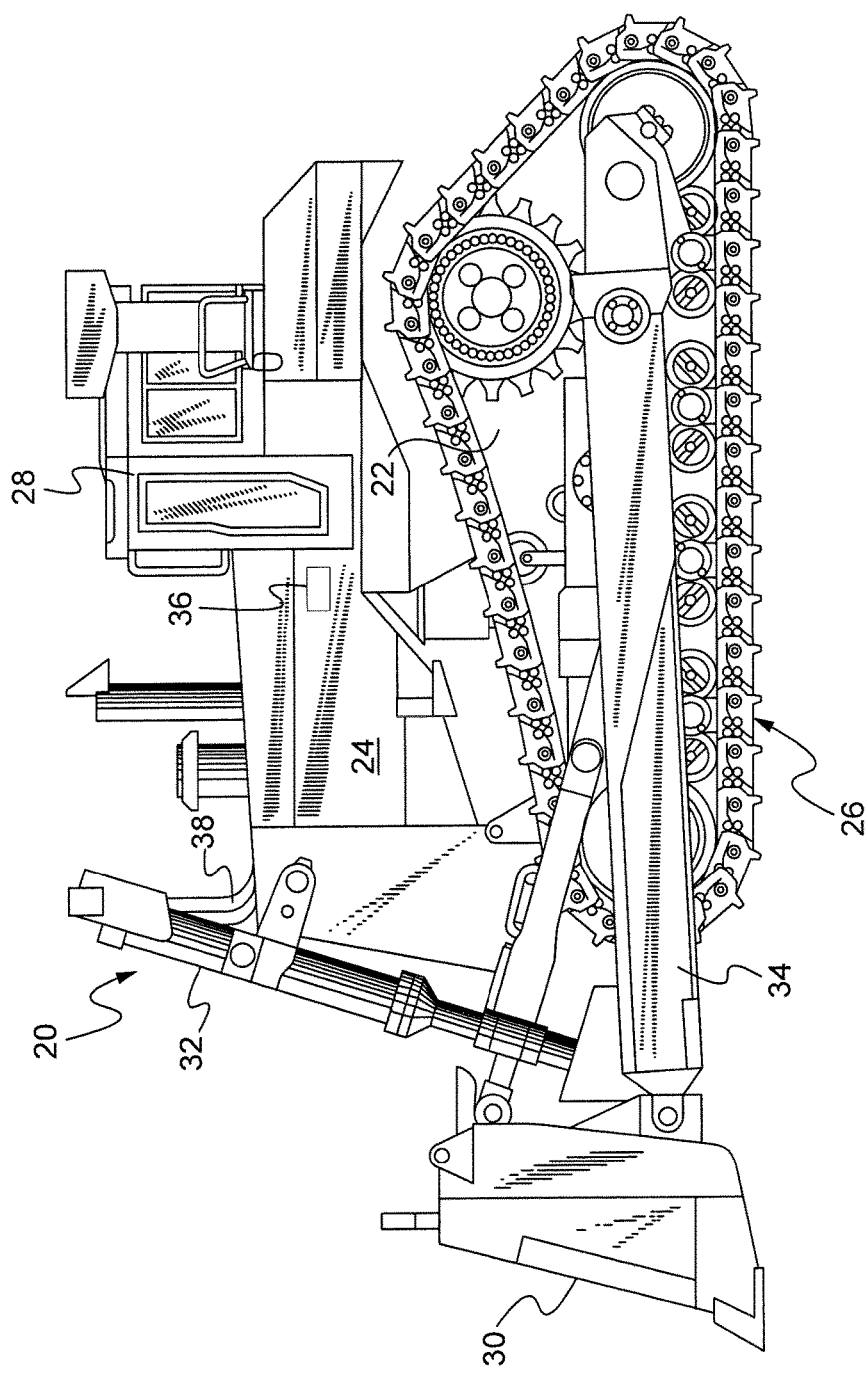
FIG. 1 is a perspective view of a machine constructed in accordance with the teachings of the present disclosure.

Referring now to drawings, and with specific reference to FIG. 1, a machine constructed in accordance to the teachings of the present disclosure is generally referred to by reference numeral 20. While the machine 20 is depicted as a track-type tractor, it is to be understood that the teachings of the present disclosure can be used with equal efficacy in connection with any other number of earth-moving machines including but not limited to loaders, motor graders, pipe layers, skid steers and the like. In addition, the teachings of the present disclosure can be used outside of earth-moving equipment including, but not limited to, other construction, agricultural, mining, marine, and on-highway machines.

With respect to the machine 20, it is shown to include a chassis 22 on which is mounted an engine 24. The machine 20 further includes first and second tracks 26 laterally flanking the machine, although in other embodiments, the form of locomotion may be provided in alternative formats such as, but not limited to, wheels. In addition, the chassis 22 supports an operator cabin 28.

As also illustrated in FIG. 1, the machine 20 may include one or more implements 30 provided to perform useful work. The implement 30 depicted in FIG. 1 is a blade, but other implements are certainly possible and well known. The implement 30 is movable relative to the machine 20 by way of one or more hydraulic cylinders 32 and boom arms 34. The hydraulic cylinders 32 are in fluid communication with a hydraulic fluid pump 36 by way of a plurality of hydraulic fluid conduits 38. The pump 36 in turn is powered by the engine 24.

Figure 2:
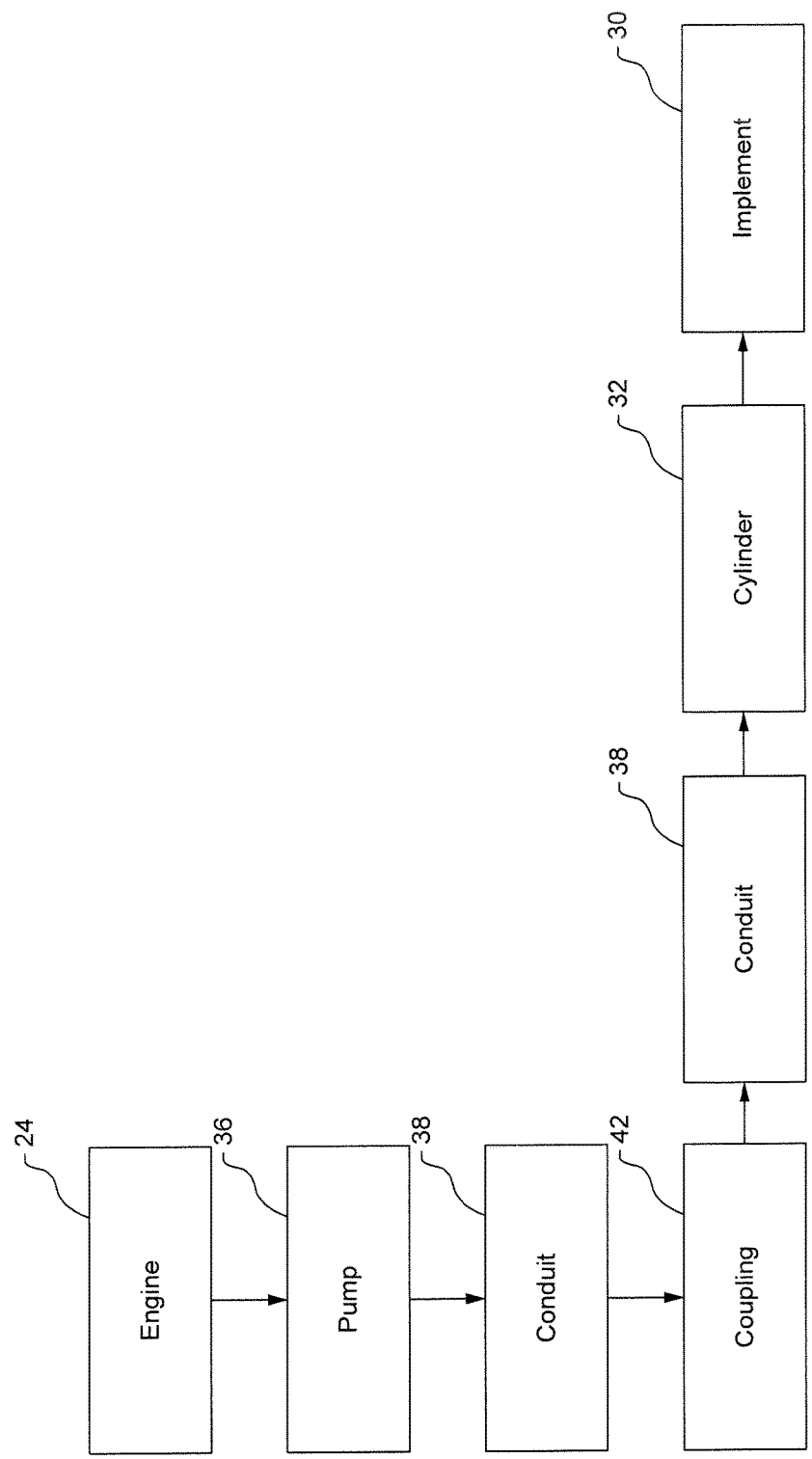
FIG. 2 is a schematic illustration of a hydraulic system constructed in accordance with the teachings of the present disclosure.

Turning now to FIG. 2, a schematic illustration of a hydraulic fluid system 40 constructed in accordance with the teachings of the present disclosure is provided. As shown therein, the hydraulic fluid system 40 includes the aforementioned pump 36 in fluid communication with the hydraulic cylinders 32 by way of conduits 38. In addition, FIG. 2 further illustrates that the plurality of hydraulic fluid conduits 38 are connected by way of hydraulic fluid line coupling systems 42 as will now be described in further detail.

Figure 4:
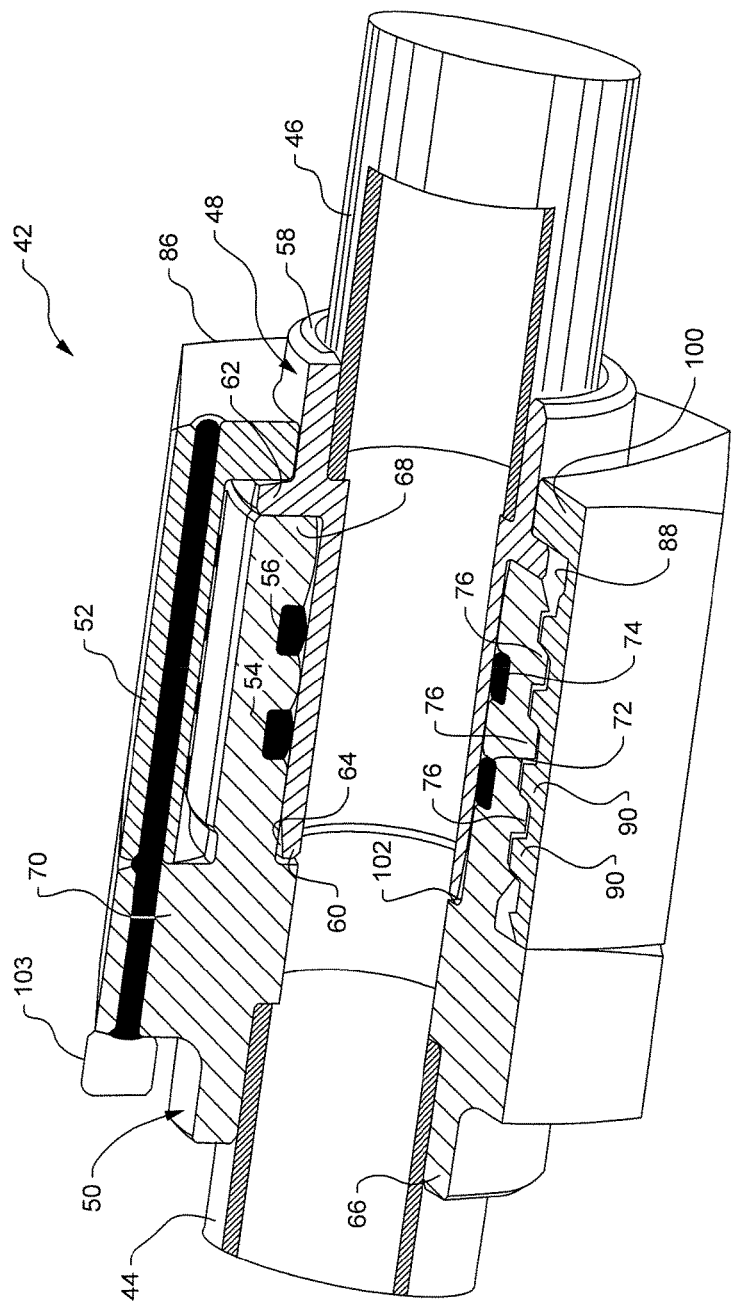
FIG. 4 is a cross-sectional view of the hydraulic fluid line coupling system of FIG. 3, with first and second hydraulic fluid conduits attached.

The hydraulic fluid line coupling system 42 is shown, in FIG. 4 connecting a first hydraulic fluid tube or hose 44 to a second hydraulic fluid tube 46. While hydraulic fluid tube couplings have been known in the prior art, the present disclosure drastically improves on such attempts by having improved sealing capability, no reliance on rotational orientation of the tubes, quicker assembly and disassembly, lower costs to manufacture, and improved resistance to accidental pressure discharge.

Figure 3:
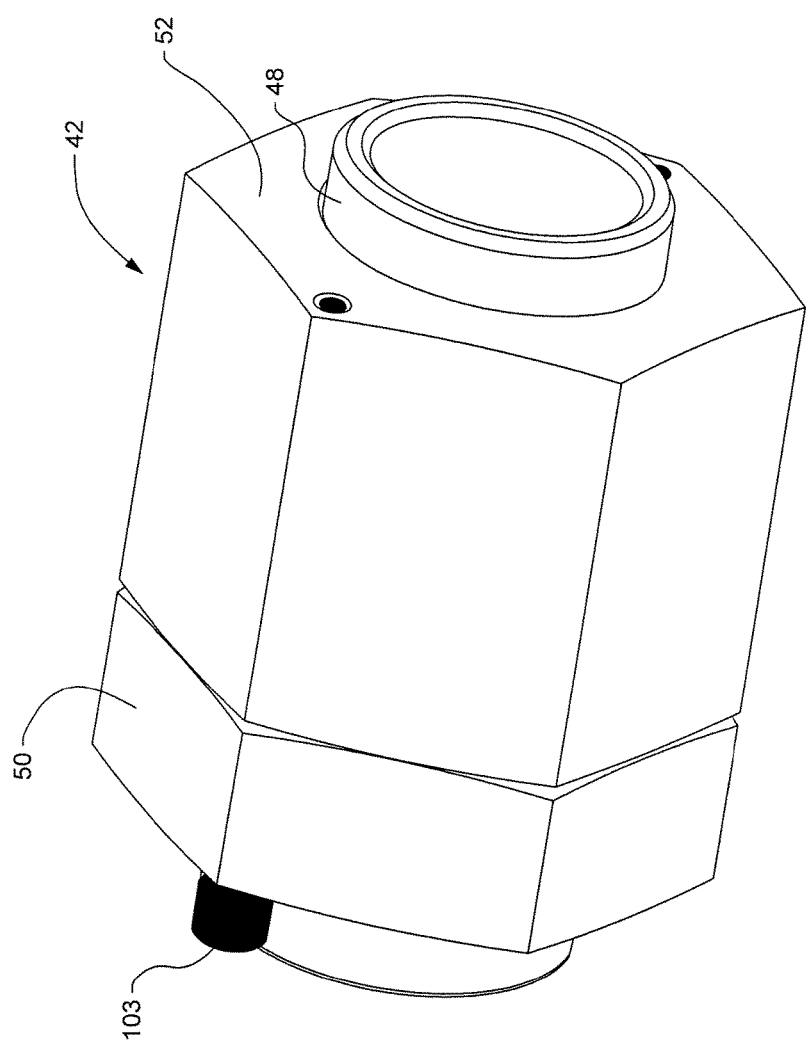
FIG. 3 is a perspective view of a hydraulic fluid line coupling system constructed in accordance with the teachings of the disclosure.
Figure 5:
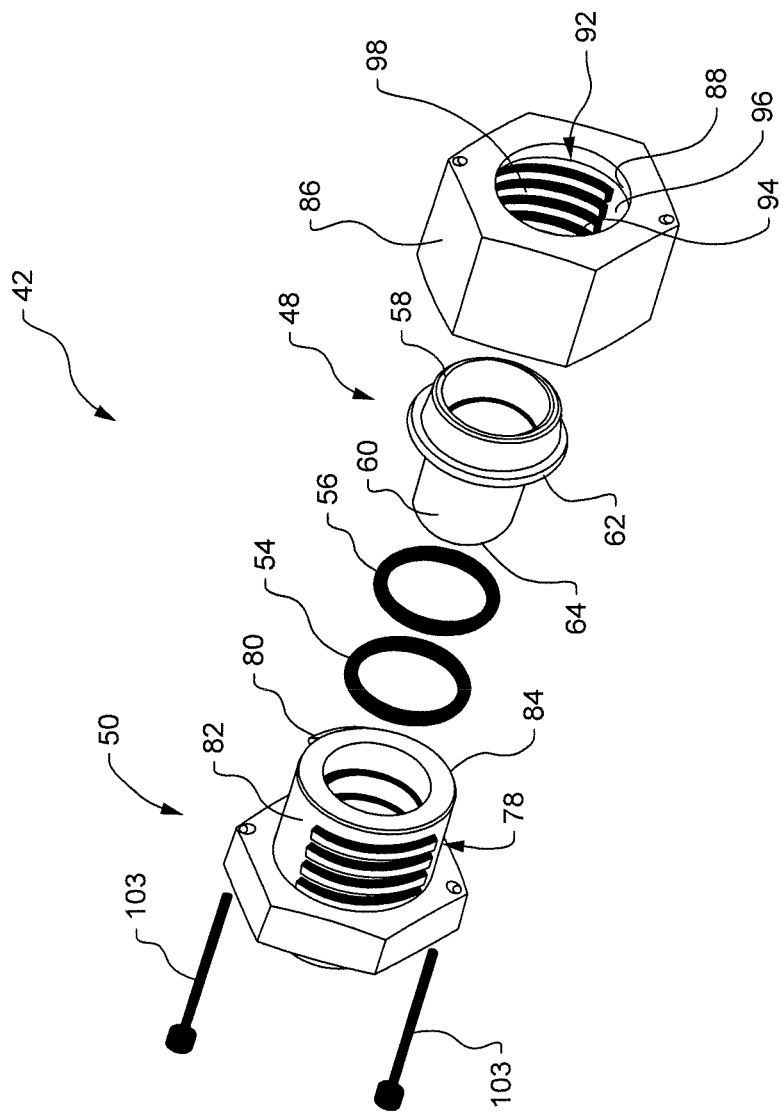
FIG. 5 is an exploded view of the hydraulic fluid line coupling system of FIG. 3.

As shown in FIGS. 3-5, the hydraulic fluid line coupling system 42 includes a male fitting 48, a female fitting 50, a lock nut 52, a first elastomeric seal 54 and a second elastomeric seal 56. With specific reference to FIG. 5, the male fitting 48 is shown in detail to be substantially cylindrical in shape including a hose or proximal end 58 and a sealing or distal end 60. Intermediate the proximal and distal ends 58 and 60, the male fitting 48 is shown to also include a radially outwardly extending shoulder 62. In addition, the distal end 60 is shown to include as a tapered rim 64, the importance of which will be described in further detail herein. Moreover, while the male fitting is shown and describes as being substantially cylindrical in shape, other geometric shapes are possible including but not limited to those which in cross-section are triangular, square, hexagonal and other polygonal shapes.

With respect to the female fitting 50, it is also shown in detail in FIGS. 4 & 5. The female fitting 50 is also substantially cylindrical in shape including a proximal or hose end 68 and a distal or sealing end 68. A circumferential rib 70 radially outwardly extends from the female fitting 58. Moreover, the female fitting 50 includes radially inward circumferential or radial grooves 72 and 74. Radially outward of the grooves 72 and 74 are a plurality of threads 76. The plurality of threads 76 are incomplete, and in some embodiments bifurcated into first and second sets 78, 80 with voids 82, 84 therebetween (as best shown in FIG. 5). In other words, the threads 76 to not traverse the entire circumference of the female fitting 50.

Turning to the lock nut 52, it is shown best in FIG. 5 to be comprised of a hexagonal outer surface 86 and inner surface 88 with a plurality of threads 90. The plurality of lock nut threads 90 are also incomplete, and in some embodiments bifurcated into first and second sets 92 and 94 with voids 96 and 98 therebetween. Accordingly, it can be seen that the threads 90 do not traverse the entire circumference of the lock nut 52, the importance of which will be described in further detail below. Moreover, the plurality of threads 90 on the lock nut 52, and the plurality of threads 76 on the female fitting 50, may be complementarily shaped and/or pitched so as to prevent over-rotation of the lock nut 52 as will be described in further detail herein. The lock nut 52 also includes a radially inwardly directed circumferential tab 100, with the plurality of threads 90 being provided perpendicular to a longitudinal axis of the lock nut 52.

Finally, also depicted in FIGS. 4 & 5 are the first elastomeric radial seal 54 and the second elastomeric radial seal 56. Whereas the male fitting 48, female fitting 50 and lock nut 52 are manufactured from rigid materials such as, but not limited to, steel and other metals, the elastomeric seals 54 and 56 are manufactured from flexible materials such as, but not limited to, rubber and polymeric O-rings, gaskets and the like. Moreover, while the hydraulic fluid line coupling 42 is shown with first and second radial seals 54, 56, it is to be understood that in other embodiments more than two, or less than two, seals can be employed.

When assembled, the hydraulic fluid line coupling system 42 joins the first tube 44 and second tube 46, as shown best in FIG. 3, in a fluid tight arrangement with redundant seals for robustness against leaks, no reliance on rotational orientation of the various components for assembly, quick assembly, and greatly improved ability to prevent accidental pressure discharges. These features are perhaps best illustrated in the sectional view of FIG. 4. As will be noted therein, the redundant sealing feature is provided by way of the first elastomeric radial seal 54 and second elastomeric radial seal 56. As shown therein, the first elastomeric seal 54 is sized so as to be inserted within the first circumferential groove 72 of the female fitting 50. When the male fitting 48 is received within the female fitting 50, the first elastomeric seal 54 is compressed within the first circumferential groove 72 so as to prevent any fluid transmission therebetween. To improve the longevity of the radial seals 54 and 56, back-up rings (not shown) could be used. The back-up rings could be annular in shape and reside within the radial grooves 72 and 74 to support the radial seals 54 and 56, respectively, so as to not extrude due to hydraulic pressure. In some embodiments, more than one back-up ring could be used so as to flank the radial seals and provide support from both sides.

In addition, the second elastomeric seal 56 is received within the second circumferential groove 74 such that when the male fitting 48 is thoroughly received within the female fitting 50, the second elastomeric seal 56 is compressed against of the female fitting 50. So as to facilitate fluid tight engagement between the male and female fittings 48 and 50, it will be noted that the tapered rim 64 is provided so as to draw the male fitting 48 fully against a shoulder of the female fitting 50 when the hydraulic fluid line coupling system 42 is assembled.

While the first and second elastomeric seal 54 and 56 provide the redundant sealing capabilities guarding against leaks, the improved ability of the hydraulic fluid line coupling system 42 against accidental pressure discharge is provided by way of the lock nut 52. As shown best in FIG. 4, the plurality of threads 90 of the lock nut 54 intermesh with the plurality of threads 76 of the female fitting 50 to lock the lock nut 52 and female fitting 50 together. Moreover, the radially inwardly directed tab 100 is sized to engage the male fitting 48 at the radially outwardly directed shoulder 62 to lock all components together. In doing so, the hydraulic fluid line coupling system 42 cannot be accidentally disconnected and thus accidental pressure discharges are avoided. Finally, as an added level of security against accidental pressure discharge, locking pins 103 connect the female fitting 50 to the lock nut 52.

Not only does the hydraulic fluid line coupling system 42 of the present disclosure provide for improved sealing and accidental pressure discharge prevention, but as will be noted, all of the components described above are not reliant on any particular rotational orientation so as to be effective. This is in marked contrast to prior art couplings which required the connecting components of the coupling to be rotated in a particular orientation before being connected. In so doing, the speed with which the coupling 42 can be assembled and disassembled is greatly improved.

The speed of assembly and disassembly is also improved by way of the bifurcated threads 76 and 90. During assembly, the lock nut 52 is simply rotated such that its voids 96 and 98 align with the thread sets 78 and 80, respectively, and the lock nut 52 can then easily slide over the female fitting 50. With a simple twist, the bifurcated threads 90 of the lock nut can then interconnect with, and lock into, the bifurcated threads 76 of the female fitting. In the depicted embodiment, this twist is about a quarter turn or 90 degrees, but in other embodiments other rotations are possible, such as 180°, 360° or the like. Moreover, the pitch and shape of the threads prevent over-rotation and always provide for proper alignment with, and receipt of, the locking pin 103.

Figure 6:
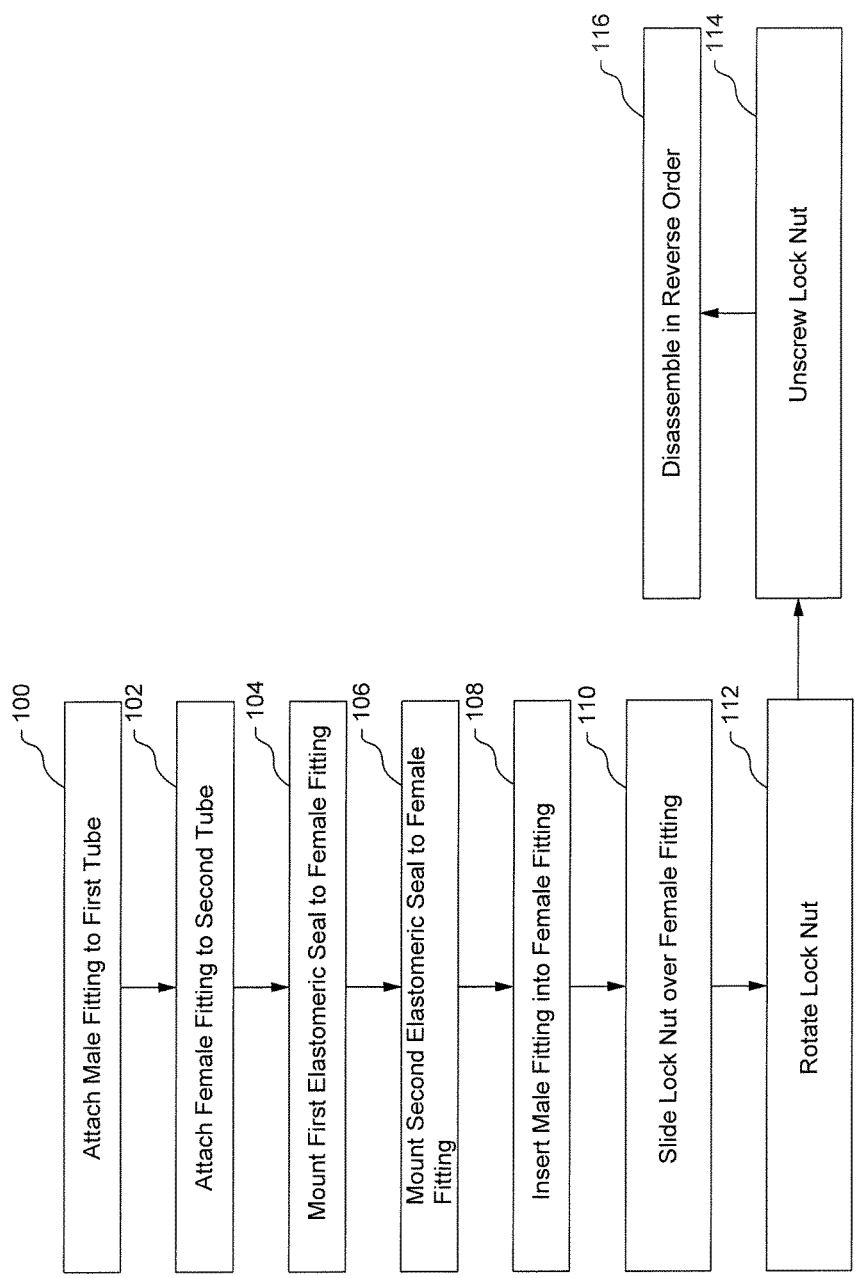
FIG. 6 is a flow chart depicting a sample sequence of steps which may be practiced in accordance with the teachings of the present disclosure.

Referring now to FIG. 6, a flow chart depicting the sample sequence of steps which may be practiced in conjunction with the teachings of the present disclosure is provided. Stated differently, the present disclosure does not only set forth structure enabling improved sealing capability and hydraulic fluid line coupling system, but also a method of improved sealing and hydraulic fluid line coupling system as well.

Starting with a step 104, the method includes attaching the male fitting 48 to the first tube 44. This may be done as by crimping, welding, brazing or the like. Similarly, in a second step 106, the female fitting 50 is attached to the second tube 46. Once the male and female fittings 48 and 50 are attached to the tubes 44 and 46, the first and second elastomeric seals 54 and 56 are mounted into the female fitting 50 as indicated in steps 108 and 110. In a next step 112, the male fitting 48 is then inserted into the female fitting 50 with the first and second elastomeric seals 54 and 56 being compressed there between. In order to secure the tubes 44 and 46 together, the lock 52 is then slid over the fence fitting 50 in a step 114, and thereafter rotated in a step 116 to lock all components in place.

While the foregoing sets forth a method for connecting the first and the second tubes 44 and 46, it is to be understood that the method of the present disclosure also includes a method for quickly disassembling the hydraulic fluid line coupling system 42 as well. In so doing, in a step 116, the hydraulic fluid line coupling system 42 is disassembled simply by twisting the lock not in the reverse direction and then, in a step 118, conducting the steps 108 through 114 in reverse order as shown by step 120.

INDUSTRIAL APPLICABILITY

In operation, the present disclosure can find industrial applicability, in a number of different settings. For example, in the construction of earth moving machines, multiple hydraulic fluid tubes are routed in and around the machine. As each of those tubes needs to be interconnected, the present disclosure sets forth a coupling for doing so in a reliable sealed manner without any reliance upon the rotational orientation of the components. In addition, it does so quickly, at a minimal of cost, and with greatly improved ability to prevent accidental pressure discharge.

With respect to improved sealing capability, such is set forth by providing redundant seals in the form of first and second elastomeric seals between the male and female fitting of the coupling. In so doing, if one seal were to degrade or even fail, the second seal will be able to continue to provide leakage prevention.

With respect to avoiding rotational orientation reliance, it can be seen that each of the components of the coupling are provided in symmetric fashion such that regardless of the rotational orientation of the components the coupling can be assembled and disassembled with ease.

With respect to speed of assembly and disassembly, as opposed to prior art devices which both require a specific rotation orientation to be operable, and multiple fasteners for providing the seal, the present disclosure provides a single lock nut which simply needs to be given a slight twist for the coupling to be assembled and/or disassembled.

Finally, with regard to prevention of accidental pressure discharge, as the assembly is connected by way of threaded components, ribs, and locking pins which physically engaging the male and female fittings, such that the likelihood of the coupling coming apart and causing accidental pressure discharge is greatly reduced.

What is claimed is:

1. A hydraulic fluid line coupling system, comprising:
a female fitting having a proximal end including a recess configured to circumferentially engage an outer circumference of a first fluid line;
a male fitting received in the female fitting having a hose end including a recess configured to circumferentially engage an outer circumference of a second fluid line; and
a lock nut securing the female fitting to the male fitting, the lock nut having a plurality of threads, wherein female fitting further includes a plurality of threads meshing with the plurality of threads on the lock nut.

2. The hydraulic fluid line coupling system of claim 1, wherein the plurality of lock nut threads are perpendicular to a longitudinal axis of the lock nut.

3. The hydraulic fluid line coupling system of claim 1, wherein the plurality of threads on the lock nut and on the female fitting are incomplete.

4. The hydraulic fluid line coupling system of claim 3, wherein the plurality of threads on the female fitting and lock nut are bifurcated.

5. The hydraulic fluid line coupling system of claim 4, further including at least one locking pin extending through the female fitting and lock nut.

6. The hydraulic fluid line coupling system of claim 1, wherein the male fitting includes a radially outwardly directed shoulder.

7. The hydraulic fluid line coupling system of claim 6, wherein the lock nut includes a radially inwardly directed shoulder engaging the radially outwardly directed shoulder of the male fitting.

8. The hydraulic fluid line coupling system of claim 7, wherein the female fitting includes a radially inwardly directed shoulder, a distal end of the male fitting engaging the radially inwardly directed shoulder of the female fitting.

9. The hydraulic fluid line coupling system of claim 8, wherein the distal end of the male fitting is circumferentially tapered.

10. The hydraulic fluid line coupling system of claim 1, wherein the female fitting includes first and second internal radial grooves receiving first and second elastomeric radial seals.

11. A method of sealing a hydraulic fluid line coupling, comprising:
inserting a male fitting having a hose end including a recess configured to circumferentially engage an outer circumference of a second fluid line into a female fitting having a proximal end including a recess configured to circumferentially engage an outer circumference of a first fluid line;
sealing the male fitting to the female fitting using first and second elastomeric seals; and
securing the female fitting to the male fitting using a lock nut having a plurality of internal threads, and a locking pin longitudinally extending through a circumferential rib of the female fitting and into a body radially extending between an inner surface and an outer surface of the lock nut.

12. The method of claim 11, further including positioning the first and second elastomeric seals radially between the male and female fittings.

13. The method of claim 11, further including providing a plurality of external threads on the female fitting, the plurality of external threads on the female fitting meshing with the plurality of internal threads on the lock nut.

14. The method of claim 13, further including bifurcating the plurality of threads on the female fitting and lock nut so as to have circumferential voids on both.

15. The method of claim 14, further including orienting the lock nut such that the plurality of internal threads align with the circumferential voids on the female fitting, sliding the lock nut over the female fitting, and rotating the lock nut.

16. The method of claim 15, further includes stopping rotation of the lock nut prior to a full rotation.

17. A machine, comprising;
a chassis;
an engine mounted on the chassis;
a hydraulic fluid pump powered by the engine;
a hydraulic cylinder in fluid communication with the hydraulic fluid pump;
a plurality of hydraulic fluid tubes connecting the hydraulic fluid pump and the hydraulic cylinder; and
a hydraulic fluid line coupling system connecting the plurality of hydraulic fluid tubes together, the hydraulic fluid line coupling system including a male fitting having a hose end including a recess configured to circumferentially engage an outer circumference of a second fluid line, a female fitting having a proximal end including a recess configured to circumferentially engage an outer circumference of a first fluid line, the female fitting having a first groove and a second groove configured to receive first and second elastomeric seals between the male and female fittings, and a lock nut securing the female fitting to the male fitting, the lock nut having a plurality of internal threads, and a locking pin longitudinally extending through a circumferential rib of the female fitting and into a body radially extending between an inner surface and an outer surface of the lock nut.

18. The machine of claim 17, wherein the female fitting includes a plurality of external threads meshing with the plurality of internal threads on the lock nut.

19. The machine of claim 17, wherein the plurality of threads on the female fitting and lock nut are incomplete.

* * * * *